United States Patent
Albal et al.

(10) Patent No.: US 9,160,778 B2
(45) Date of Patent: Oct. 13, 2015

(54) SIGNALING ENABLING STATUS FEEDBACK AND SELECTION BY A NETWORK ENTITY OF PORTIONS OF VIDEO INFORMATION TO BE DELIVERED VIA WIRELESS TRANSMISSION TO A UE

(75) Inventors: Nandakishore A. Albal, Scottsdale, AZ (US); John M. Harris, Glenview, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 130 days.

(21) Appl. No.: 13/281,621

(22) Filed: Oct. 26, 2011

(65) Prior Publication Data

US 2013/0111052 A1     May 2, 2013

(51) Int. Cl.
| | |
|---|---|
| *G06F 15/16* | (2006.01) |
| *H04L 29/06* | (2006.01) |
| *H04N 21/2343* | (2011.01) |
| *H04N 21/6338* | (2011.01) |
| *H04N 21/647* | (2011.01) |
| *H04H 20/57* | (2008.01) |
| *H04N 21/61* | (2011.01) |

(52) U.S. Cl.
CPC ............. *H04L 65/605* (2013.01); *H04H 20/57* (2013.01); *H04L 65/80* (2013.01); *H04N 21/23439* (2013.01); *H04N 21/6137* (2013.01); *H04N 21/6338* (2013.01); *H04N 21/64784* (2013.01)

(58) Field of Classification Search
CPC .. H04L 65/605; H04L 65/80; H04N 21/6137; H04N 21/64784; H04N 21/6338; H04N 21/23439; H04H 20/57
USPC .................................................. 709/230–235
See application file for complete search history.

(56) References Cited

U.S. PATENT DOCUMENTS

| | | | |
|---|---|---|---|
| 6,014,706 A * | 1/2000 | Cannon et al. ................. | 709/231 |
| 6,754,715 B1 * | 6/2004 | Cannon et al. ................. | 709/231 |
| 6,778,525 B1 | 8/2004 | Baum et al. .................... | 370/351 |
| 7,058,721 B1 | 6/2006 | Ellison et al. .................. | 709/231 |
| 7,073,011 B2 | 7/2006 | Lisitsa et al. ................... | 710/316 |
| 7,359,344 B1 | 4/2008 | Cheng et al. ................... | 370/321 |
| 7,475,106 B2 | 1/2009 | Agnoli et al. .................. | 709/201 |
| 7,587,454 B2 | 9/2009 | Shabtai et al. ................. | 709/205 |

(Continued)

FOREIGN PATENT DOCUMENTS

| | | |
|---|---|---|
| EP | 2210394 A2 | 7/2013 |
| WO | WO-2007/047031 A2 | 4/2007 |

(Continued)

*Primary Examiner* — Edward Kim
(74) *Attorney, Agent, or Firm* — Harrington & Smith

(57) ABSTRACT

A method includes exchanging signaling between a first entity providing access by a user equipment to a video stream and a second entity through which the video stream passes prior to being delivered via wireless transmission to the user equipment, the second entity receiving video information corresponding to the video stream, the exchanged signaling associated with the video information received at the second entity. Responsive to the exchanged signaling, sending information from the first entity to the second entity to modify status at the second entity of at least a portion of the video information previously received at the second entity. Another method includes at the first entity, receiving from a second entity an indication the second entity is capable of accepting multiple resolutions of a video in the video stream. Responsive to the received indication, the first entity sends to the second entity multiple resolutions of the video.

12 Claims, 6 Drawing Sheets

(56) References Cited

U.S. PATENT DOCUMENTS

| | | | |
|---|---|---|---|
| 7,640,352 B2 | 12/2009 | Klemets et al. | 709/231 |
| 7,721,339 B2 | 5/2010 | Madison et al. | 726/27 |
| 7,760,801 B2 | 7/2010 | Ghanbari et al. | 375/240.03 |
| 7,801,158 B2 | 9/2010 | Voit et al. | 370/401 |
| 7,818,444 B2 | 10/2010 | Brueck et al. | 709/231 |
| 7,886,073 B2 | 2/2011 | Gahm et al. | 709/231 |
| 7,912,893 B2 | 3/2011 | Agnoli et al. | 709/201 |
| 2003/0140159 A1* | 7/2003 | Campbell et al. | 709/231 |
| 2005/0190794 A1 | 9/2005 | Krause et al. | 370/485 |
| 2006/0222110 A1 | 10/2006 | Kuhz | 375/334 |
| 2009/0116458 A1 | 5/2009 | Ramesh et al. | 370/336 |
| 2009/0300209 A1* | 12/2009 | Elzur | 709/234 |
| 2010/0011103 A1 | 1/2010 | Luzzatti et al. | 709/226 |
| 2010/0023582 A1* | 1/2010 | Pedersen et al. | 709/203 |
| 2010/0191858 A1 | 7/2010 | Thomas et al. | 709/231 |
| 2010/0268836 A1* | 10/2010 | Jabri et al. | 709/231 |
| 2011/0037935 A1 | 2/2011 | Tseng et al. | 349/149 |
| 2011/0149145 A1 | 6/2011 | Ramos et al. | 348/441 |

FOREIGN PATENT DOCUMENTS

| | | |
|---|---|---|
| WO | WO-2007130264 A2 | 11/2007 |
| WO | WO-2009/085400 A1 | 7/2009 |
| WO | WO-2010112074 A1 | 10/2010 |
| WO | WO-2011030811 A1 | 3/2011 |

\* cited by examiner

SIGNALING ENABLING STATUS FEEDBACK AND SELECTION BY A NETWORK ENTITY OF PORTIONS OF VIDEO INFORMATION TO BE DELIVERED VIA WIRELESS TRANSMISSION TO A UE

TECHNICAL FIELD

This invention relates generally to networks and, more specifically, relates to the delivery of video to a user equipment (UE) in wireless communication with a radio access network.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

More wireless, mobile devices are able to download or stream video, and this trend appears to be increasing. A radio access network serving many mobile devices ideally would be able to handle all of the video being requested by these devices. However, as the number of mobile devices increases and video remains popular, radio access networks may not be able to deliver all of the requested video as efficiently as possible.

A service entity such as media optimizer (MO) and video servers use corresponding video protocols used to optimize video downloading provide powerful techniques for significantly increasing system capacity and video quality. In particular, if the service entities provide more video to the radio access network, well in advance (e.g., seconds) of when that video will likely be downloaded or required by a mobile device, this enables the radio access network to quickly exploit any short term improvement in radio frequency (RF) conditions or loading. That is, the radio access network can send additional video to mobile devices because of the short term improvement.

If the service entities provide more video than strictly required to the radio access network, this tends to prevent flexibility of the radio access network in quickly adapting the best possible level of video compression and video frame type on shorter timescales, e.g., based on anticipated future system loading, packet loss (e.g., if significant packet loss, then additional compression may be appropriate when a packet is retransmitted by radio link control), user media selection such as fast-forward, or video abandonment by user. This tends to result in more packet loss at the radio access network, e.g., when radio access network memory is exhausted.

Thus, it difficult to achieve the benefits of having more video at the radio access network while avoiding the detriments to having more video.

SUMMARY

In an exemplary embodiment, a method is disclosed that includes exchanging signaling between a first entity providing access by a user equipment to a video stream and a second entity through which the video stream passes prior to being delivered via wireless transmission to the user equipment. The second entity receives video information corresponding to the video stream. The exchanged signaling is associated with the video information received at the second entity. The method also includes responsive to the exchanged signaling, sending information from the first entity to the second entity to modify status at the second entity of at least a portion of the video information previously received at the second entity.

In an exemplary embodiment, an apparatus is disclosed that includes means for exchanging signaling between a first entity providing access by a user equipment to a video stream and a second entity through which the video stream passes prior to being delivered via wireless transmission to the user equipment. The second entity receives video information corresponding to the video stream. The exchanged signaling is associated with the video information received at the second entity. The apparatus also includes means, responsive to the exchanged signaling, for sending information from the first entity to the second entity to modify status at the second entity of at least a portion of the video information previously received at the second entity.

In a further exemplary embodiment, a method includes exchanging signaling between a first entity providing access by a user equipment to a video stream and a second entity through which the video stream passes prior to being delivered via wireless transmission to the user equipment, the second entity receiving video information corresponding to the video stream, the exchanged signaling associated with the video information received at the second entity. The method includes, responsive to the exchanged signaling, receiving from the first entity and at the second entity information to modify status at the second entity of at least a portion of the video information previously received at the second entity.

In an additional exemplary embodiment, an apparatus includes means for exchanging signaling between a first entity providing access by a user equipment to a video stream and a second entity through which the video stream passes prior to being delivered via wireless transmission to the user equipment. The second entity receives video information corresponding to the video stream. The exchanged signaling is associated with the video information received at the second entity. The apparatus includes means, responsive to the exchanged signaling, for receiving from the first entity and at the second entity information to modify status at the second entity of at least a portion of the video information previously received at the second entity.

In another exemplary embodiment, a method includes at a first entity providing access by a user equipment to a video stream, receiving from a second entity an indication the second entity is capable of accepting multiple resolutions of a video in the video stream, where video information in the video stream is to be delivered via wireless transmission to the user equipment and wherein the video stream passes through the second entity prior to being delivered via wireless transmission to the user equipment. The method includes responsive to the received indication, the first entity sending to the second entity multiple resolutions of the video in the video stream.

In another exemplary embodiment, an apparatus includes means for providing access at a first entity by a user equipment to a video stream and means for receiving from a second entity an indication the second entity is capable of accepting multiple resolutions of a video in the video stream. Video information in the video stream is to be delivered via wireless transmission to the user equipment and wherein the video stream passes through the second entity prior to being delivered via wireless transmission to the user equipment. The apparatus includes means, responsive to the received indication, for sending from the first entity to the second entity multiple resolutions of the video in the video stream.

In a further exemplary embodiment, a method includes sending to a first entity providing access by a user equipment to a video stream and from a second entity an indication the second entity is capable of accepting multiple resolutions of a video in the video stream, where video information in the video stream is to be delivered via wireless transmission to the user equipment and wherein the video stream passes through the second entity prior to being delivered via wireless transmission to the user equipment. The method includes responsive to the received indication, receiving at the second entity and from the first entity multiple resolutions of the video in the video stream.

DETAILED DESCRIPTION OF THE DRAWINGS

As described above, it is difficult to achieve the benefits of having more video than strictly necessary (e.g., required by a mobile device for smooth video playback) at the radio access network while avoiding the detriments to having more video. In particular, in conventional systems, once a packet or other video information is transmitted from the service entities to the radio access network, the packet cannot be recalled or revised by the media optimizer.

The instant invention solves these problems by, e.g., improving efficiency of video content delivery over networks, including radio access networks, by adding intelligence and signaling capabilities to several entities within the network (e.g., a content aware network, CAN). As an example, signaling is performed between the radio access network and a service entity, such as media optimizer and/or CAN-EG (content aware network-enabling gateway) or other video proxy or provider, and exemplary embodiments of the invention are applied, responsive to the signaling, to enable selection by a network entity of video information corresponding to a video stream between the radio access network and a user equipment (e.g., a wireless, mobile device). Exemplary embodiments can therefore take on some of the former end-to-end functions for managing video stream downloads.

In an exemplary embodiment, for macro networks, there is addition of new signaling capability and improved video delivery techniques for a CAN gateway (e.g., to create a CAN-EG), a media optimizer or content servers, enhanced eNodeB (evolved Node B, also abbreviated "eNB") and other network entities part of the radio access network or the core. It is also noted that the term "eNodeB" is commonly applied to LTE (long term evolution) networks only. However, the exemplary embodiments are not limited to LTE and may be applied to other ratio access technologies like GSM/UMTS (global system for mobile communications/universal mobile telecommunications system), CDMA (code division multiple access) and LTE-A (LTE-advanced). For small cells, an exemplary embodiment of the instant invention involves, e.g., addition of a surrogate CDN and addition of media optimizer and content delivery network capabilities within the small cell.

Figure 1:
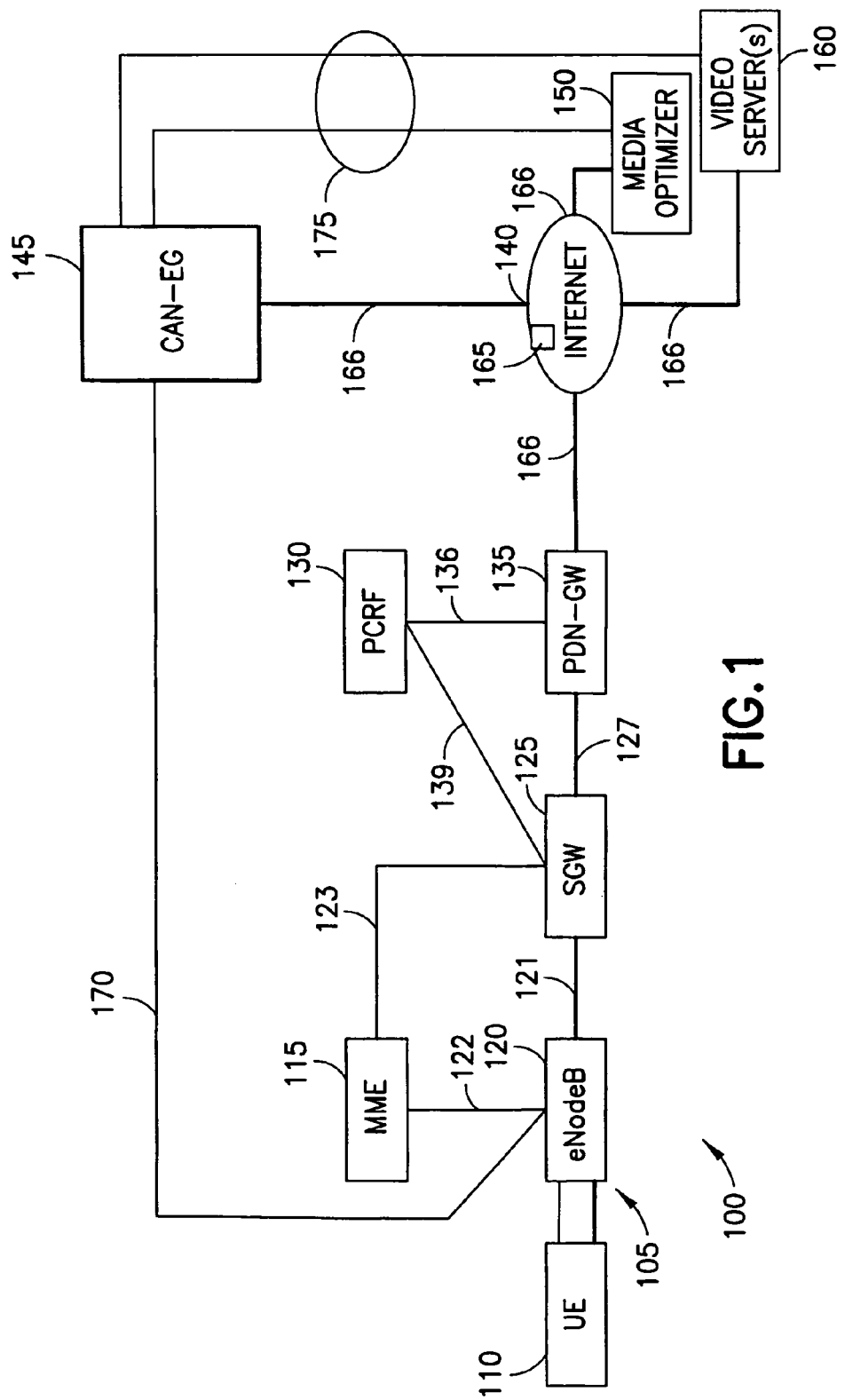
FIGS. 1 and 2 illustrate block diagrams of exemplary systems in which the instant invention may be used.

Turning now to FIG. 1, this figure illustrates a block diagram of an exemplary system into which the instant invention may be used. FIG. 1 is an example of a video server—RAN interfaced architecture for a macro cell. The architecture shows a user equipment 110 communicating via a wireless connection 105 (including uplink and downlink) to a network 100. The network 100 includes an eNode B (evolved Node B, also called E-UTRAN Node B, where E-UTRAN is evolved-universal terrestrial radio access network) 120, a serving gateway (SGW) 125, a mobility management entity (MME) 115, a policy and charging rules function (PCRF) 130, a packet data network gateway (PDN-GW) 135, a content aware network-enabling gateway (CAN-EG) 145, a media optimizer 150, and video server(s) 160. E-UTRAN is also called long term evolution (LTE). The network 100 is coupled to the Internet 140 and in particular to a content source 165 in the Internet 140.

The eNodeB 120 is connected to the SGW 125 via a network 121, e.g., implementing an S1 interface. The SGW 125 is connected to the PDN-GW 135 via a network 127, e.g., implementing an S5/S8 interface. The SGW 125 is also connected to the PCRF 130 via a network 139, e.g., implementing a Gxx/Gxa interface. The SGW 125 is further connected to the MME 115 via a network 123, e.g., implementing an S11 interface. The PDN-GW 135 is connected to the PCRF 130 over a network 136 (implementing, e.g., a Gx interface). The Internet 140 is connected to the CAN-EG 145, the media optimizer 150, the video server(s) 160, and the PDN-GW 135 via multiple networks 166 implementing at least internet protocol (IP) interfaces. The network 175 implements, e.g., a diameter protocol (providing, e.g., provide an Authentication, Authorization and Accounting (AAA) framework) over a stream control transmission protocol (SCTP), a transport layer protocol. Network 170 between the CAN-EG and the eNodeB 120 may implement a GTP-u interface. GTP stands for GPRS tunneling protocol, where GPRS stands for general packet radio service. GTP-u is a GPRS tunneling protocol user plane. As is known, GTP-U protocol is used over S1-U, X2, S4, S5, and S8 interfaces of the Evolved Packet System (EPS).

It is noted that the entities in the network 100 are merely exemplary, and there may be different, fewer, or more entities. Furthermore, the various networks and the corresponding implementation of interfaces and/or protocols are also merely exemplary. It should also be noted the elements of the "radio access network" (RAN) are radio access technology (RAT) specific. For instance, in LTE, network is defined as EUTRAN/EPC (Enhanced UTRAN/Enhanced Packet Core). The eNodeB is the only component of the RAN/EUTRAN, whereas the MME, SGW, PDN-GW, PCRF are part of the EPC. In UMTS, the NodeB and the RNC (radio network controller) are part of the RAN while the SSGN, GGSN, PCRF are part of the core.

In this example, the user equipment 110 connects to the content source 165 in the Internet 140 to download video via the media optimizer 150. Optimized content is streamed from the media optimizer 150 or video server 160 to the PDN-GW 135 which forwards the content to the SGW 125 and finally through the eNodeB 120 to the UE 110. The CAN-EG allows the video server 160 and media optimizer 150 to establish and modify the bearer characteristics between the PDN-GW 135 and the UE 110 by making the requests via the CAN-EG 145.

The CAN-EG 145 also collects network metrics from the eNodeB 120 and other network elements and reports these to the media optimizer 150 and video server 160. Additionally the media optimizer 150 and video servers 160 communicate with the eNodeB 120 using network 170 via the CAN-EG. The video server(s) 160 in this example act to cache video from the content source(s) 165. As such, the video server(s) 160 are considered surrogate servers, since these servers 160 contain cached copies of the videos in content sources 165.

Figure 2:
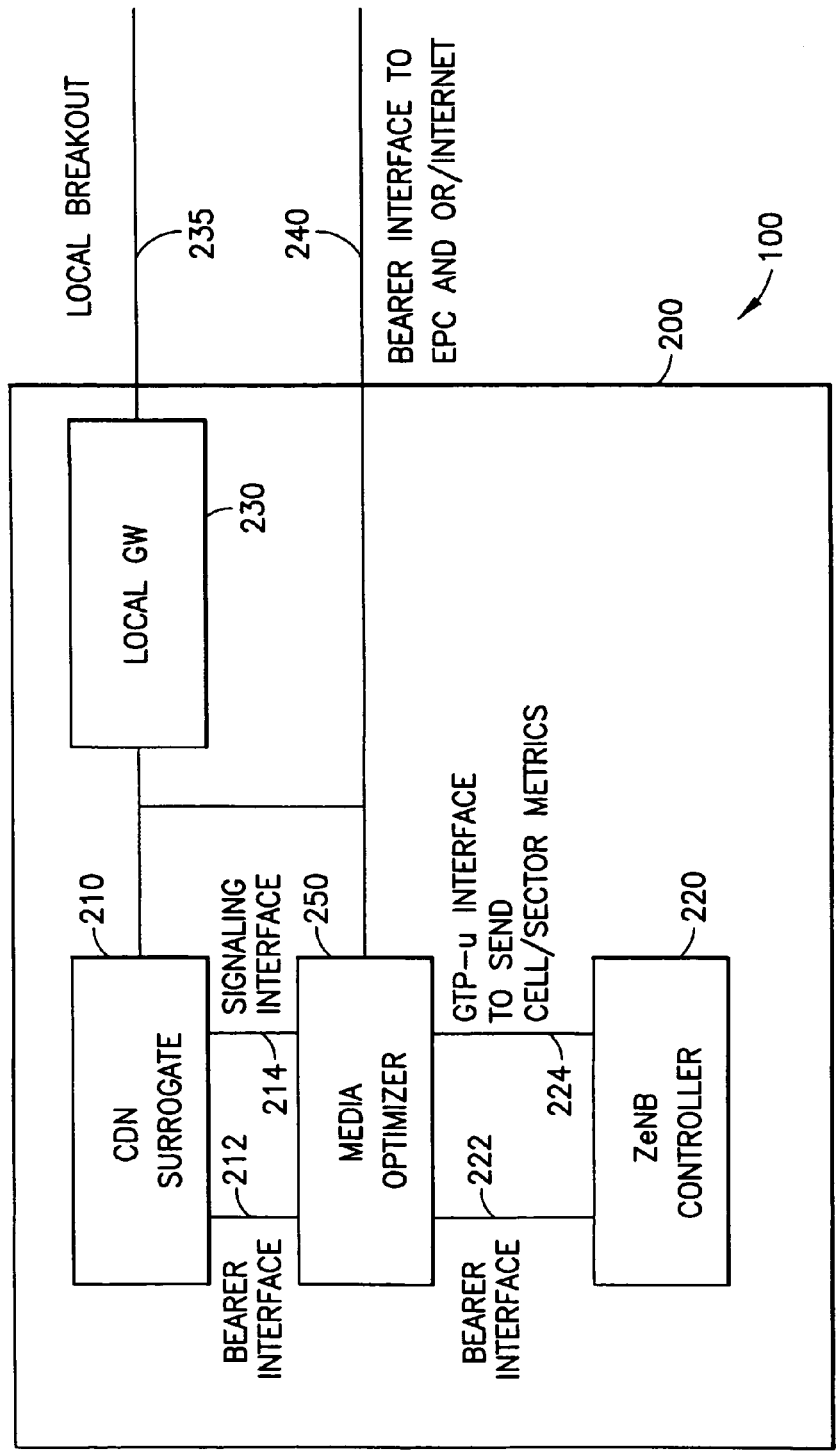

Referring to FIG. 2, this figure illustrates a block diagram of another exemplary system in which the instant invention may be used. This is an example of applicability to "small" cell architectures, such as pico or femto cells. In this example, the system 200 is located near or coincident with a cell phone tower. The system 200 includes a "zone" eNB (ZeNB) controller 220, a media optimizer 250, a content delivery network (CDN) surrogate 210, and a local gateway (GW) 230. The ZeNB controller 220 controls multiple eNodeBs (not shown in FIG. 2) and communicates with the media optimizer 250 using, in this example, a bearer interface 222 and a GTP-u interface 224. The GTP-u interface 224 allows the ZeNB controller 220 to send cell/sector metrics to the media optimizer 250 and allows the ZeNB controller 220 to receive requests from the media optimizer 250. Such metrics provide the media optimizer 250 an indication of the state of the cell/sector that the media optimizer 250 uses to determine the parameters for video optimization.

The media optimizer 250 communicates in this example with a CDN surrogate 210 via a bearer interface 212 and a signaling interface 214. The CDN surrogate 210 acts as a local cache of content such as video. The CDN surrogate 210 communicates with a bearer interface 240 (as does the media optimizer 250) to the evolved packet core (EPC), the Internet, or both. The local gateway 230 also communicates via a network 235 providing a local breakout of bearer traffic to the network instead of routing the bearer traffic over the wireless network via interface 240.

Entities of the network 100, examples of which are shown in FIGS. 1 and 2, use signaling to enable selection of video information pending in the network 100 to be delivered to the user equipment 110 and to perform one or more actions to enable the selection of video information based on the signaling. That is, exemplary embodiments improve media optimizer (MO)/server to network 100 communications, enabling greater efficiencies over the air while, e.g., achieving content customization in a shorter timescale. It should be noted that video information can be packets of video information, frames of video information, or sets of frames of video information, as examples.

In an example, media optimizer 150/250 to RAN signaling enables and is associated with replacement of video information currently pending at the RAN. For instance, the RAN signals to the media optimizer/server to indicate the RAN is capable of accepting multiple video resolutions of the same video stream. That is, the media optimizer/server takes the action of transmitting to the RAN multiple resolutions of video, in response to the RAN being identified as a RAN that can accept such multiple resolutions of video. Furthermore, these resolutions are based on multiple criteria, one of which is the cell/sector and network metrics detailed above. In terms of the "server", the server could be the origin server (e.g., the content source 165) having an original copy of a video or a server having a cached copy of the video, such as a video server 160 or a CDN surrogate 210. Having multiple copies of video enables more dynamic media selection at the RAN (e.g., the eNodeB), such that the RAN can choose which video resolution to transmit based on, e.g., RF conditions for a user equipment 110 and current cell/sector conditions. Furthermore, the RAN signals to the media optimizer/server that particular video information was/were swapped or was/were not swapped. For instance, there may be a set of frames that have to be transmitted in total in order, e.g., to maintain video synchronization. If the RAN is in the middle of transmitting the set of frames (at an initial resolution), once a new set of frames is selected from the multiple resolutions of video at a different resolution than the initial resolution, the RAN can signal to the media optimizer/server that video information related to the new resolution was swapped with video information related to the initial resolution. The media optimizer/server can use this information, e.g., to determine that at least video information corresponding to the new resolution should be sent to the RAN and perhaps not to send video information corresponding to the initial resolution, as least for certain set(s) of frames. Similarly, the RAN may select only video information in the multiple resolutions of video corresponding to the initial resolution. The media optimizer/server can use this information, e.g., to determine that at least video information corresponding to the initial resolution should be sent to the RAN.

As another example, the RAN signals to the media optimizer/server to indicate to the media optimizer how much video information was: (1) delivered and/or (2) purged (e.g., not delivered). Purging of video can occur when a memory limitation was encountered by the RAN, or an RF loss occurred. The indication of video delivered may also acknowledge that the RAN delivered only some of the total possible video, e.g., due to a memory limitation or RF loss. Knowledge of delivery/purging allows the media optimizer 150/250 to determine not to perform a "do over" for the corresponding video information. That is, the media optimizer 150/250 may not need to re-send the video information again. On the other hand, the media optimizer 150/250 may opt to re-send some of the video information again, e.g., if the user might benefit from seeing the undelivered/purged video.

As another example, the RAN signals to the media optimizer/server to indicate a request for more video than is currently pending at the RAN. The extra video allows the RAN, e.g., to communicate more video than necessary if, e.g., RF conditions for a user equipment 110 are suitable. The media optimizer/server takes the action of sending more video than is necessary in its estimation.

As yet another example, the media optimizer/server transmits to the RAN one or more requests to the RAN to delete specific video information (e.g., packets, frames, sets of frames) and optionally replace the deleted video information with specific different video information. For instance, the media optimizer/server transmits to the RAN in response to the media optimizer seeing a video stop (e.g., video abandonment by user or stop command), a fast forward command, a pause command on the uplink. The media optimizer/server can signal, e.g., the eNodeB 120 (or ZeNB controller 220) to delete any currently pending video in the eNodeB 120, or in response to the media optimizer/server seeing the user fast forward within the video, thereby allowing the RAN to use its resources for other users. The media optimizer/server can also send instructions to the RAN to cause the RAN to replace video information (e.g., packets, frames, or sets of frames) not delivered or previously purged with new packets of different (or partially the same as previously not delivered/purged) video information and also send the different video information to the RAN. An additional example includes the RAN signaling to the media optimizer/server that particular video information was (or was not) swapped. The actions taken for particular user actions such as video abandonment, a stop command, a pause command, and fast forward/rewind are protocol specific. For video processed by the media optimizer such as HTTP (hypertext transfer protocol)-progressive download or HTTP-PD video, a pause has little effect on the streaming of the video. Instead, the video continues to get streamed to the user equipment and buffered. For "adaptive streaming" video implemented by certain companies, the pause/stop commands result in the server stopping the streaming and resuming when the user 'plays' the video. In this case, it is wasteful for the RAN to continue allocating resources to this user. Note that the Adaptive Streaming protocols ensure that there is enough content in the buffer of the user equipment to play out so that the buffer is not 'starved' when 'play' resumes. It is noted that there are multiple options for the media optimizer/server to determine that a stop event (e.g., command), fast forward event (e.g., command), or pause event (e.g., command) has occurred. For instance, some video protocols provide these commands explicitly. A timeout could determine a stop event has occurred.

As a further example, the RAN signals to the media optimizer/server that particular video information was (or was not) swapped. If particular video information was swapped, then that may impact what future video information is supplied, e.g., as subsequent video information sometimes contain a Delta or difference relative to previously delivered frames of video information. By enabling the media optimizer or server to request the replacement of the video information which is currently pending at the ZeNB, this enables the media optimizer or server to more quickly change the level of video compression, avoiding the case where the video is not sufficiently compressed and bottlenecks the wireless link. Another example is where the user has fast forwarded and the video currently pending is no longer important to be downloaded. In one scenario, the server may request that a portion of the video information be purged but the remaining portion should be delivered, e.g., as in the case where the user fast forwarded within the video only a small amount.

In terms of FIGS. 1 and 2, the above-related examples may have more or less applicability. For instance, in FIG. 1, because of the potential latency from, e.g., the media optimizer 150 to, e.g., the eNodeB 120, there may be more benefit to sending multiple resolutions of a same video from, e.g., the media optimizer 150 to the eNodeB 120, as compared to FIG. 2, where the entities are assumed to be geographically close together and there are fewer entities between an eNodeB and the media optimizer 250/CDN surrogate 210. Nonetheless, the sending multiple resolutions of a same video and the exemplary video information swapping embodiments are suitable for both of the systems shown in FIGS. 1 and 2 (and other systems).

Figure 3:
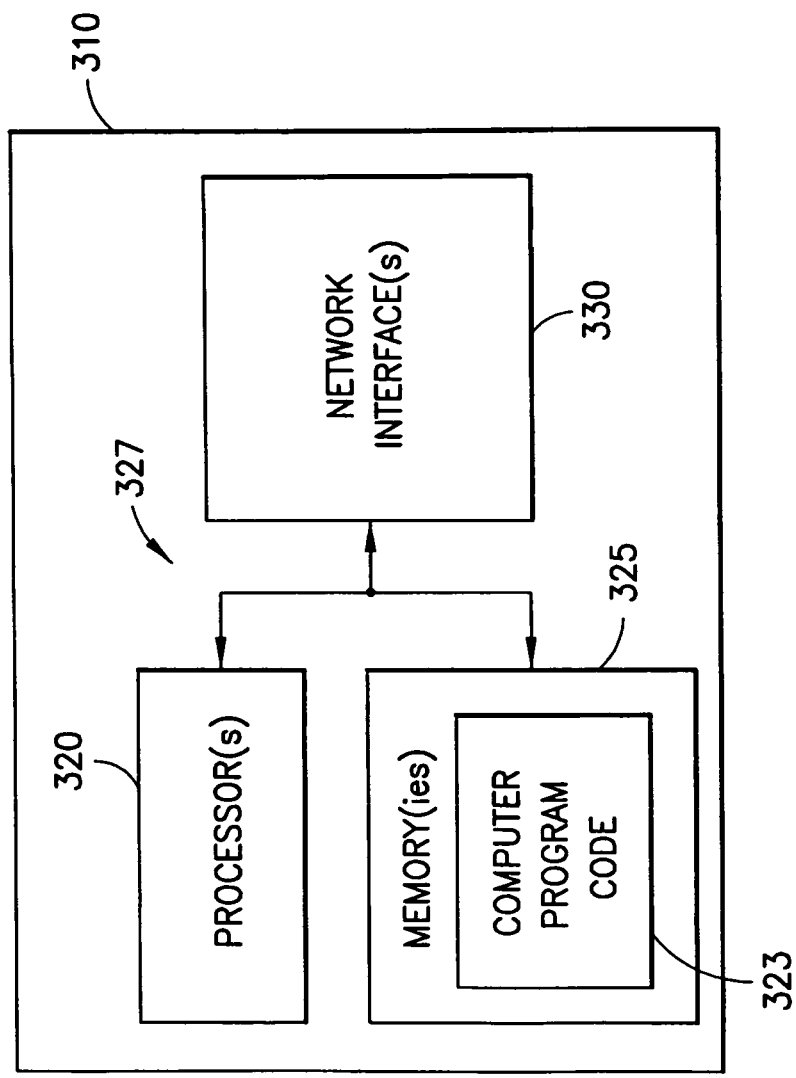
FIG. 3 illustrates a block diagram of an exemplary computer system suitable for implementing embodiments of the instant invention.

Turning now to FIG. 3, this figure illustrates a block diagram of an exemplary computer system suitable for implementing embodiments of the instant invention. As described above and in more detail below in reference to signaling diagrams, the exemplary embodiments involve multiple entities in the network 100, such as the media optimizer 150, the PDN-GW 135, the eNodeB 120, the CDN surrogate 210, the video servers 160, the content sources 160, and/or the CAN-EG 145. Each one of these entities may include the computer system 310 shown in FIG. 3. Computer system 310 comprises one or more processors 320, one or more memories 325, and one or more network interfaces 330 connected via one or more buses 327. The one or more memories 325 include computer program code 323. The one or more memories 325 and the computer program code 323 are configured to, with the one or more processors 320, cause the computer system 310 (and thereby a corresponding one of, e.g., the media optimizer 150, the PDN-GW 135, the eNodeB 120, the CDN surrogate 210, the video servers 160, the content sources 160, and/or the CAN-EG 145) to perform one or more of the operations described herein.

Figure 4:
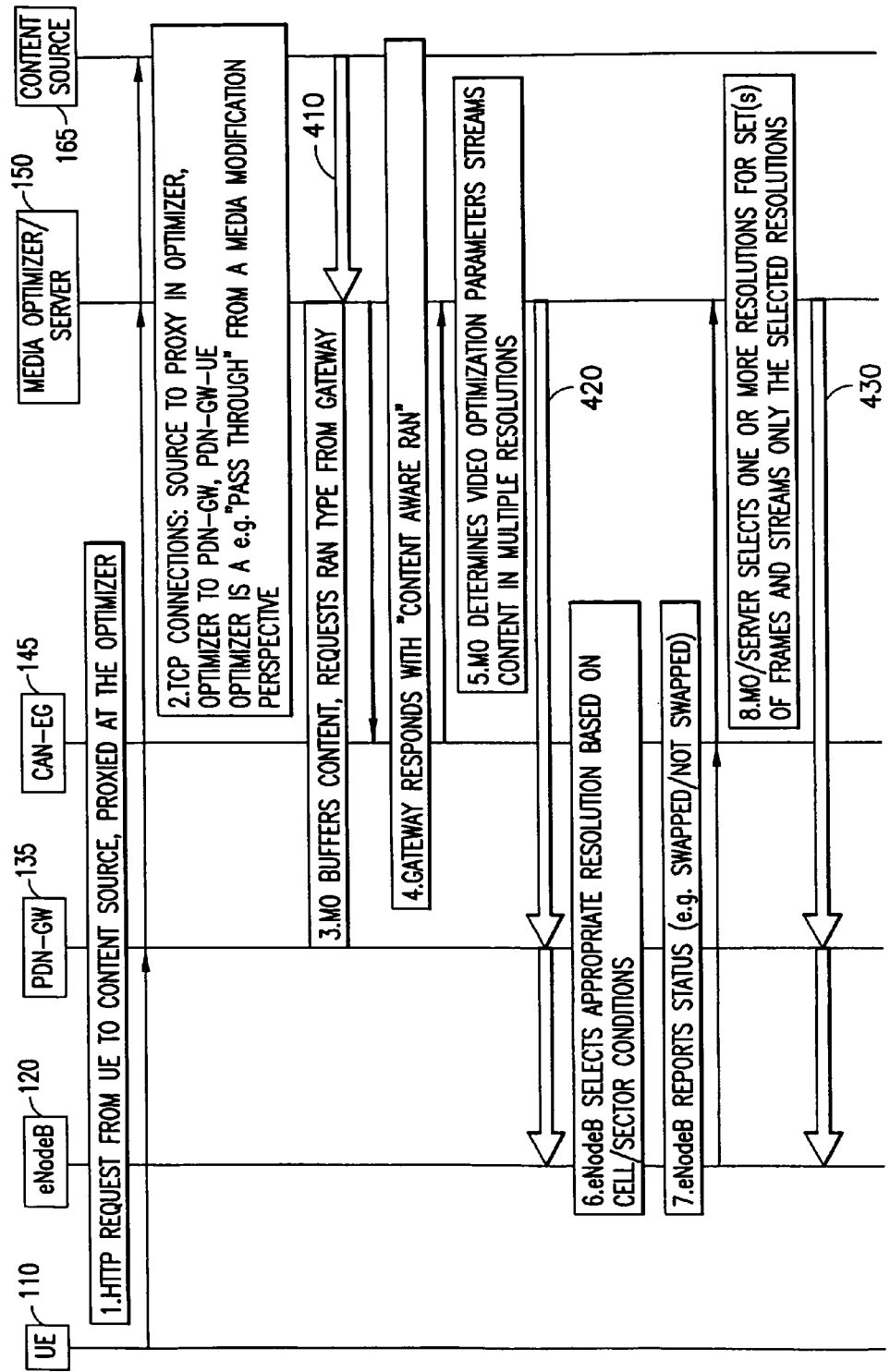
FIG. 4 illustrates a signaling diagram for one example of network and media optimizer/server signaling and corresponding actions performed responsive to the signaling.

Turning now to FIG. 4, FIG. 4 illustrates a signaling diagram for one example of network entity and media optimizer/server signaling and corresponding actions performed responsive to the signaling. In this example, the user equipment (UE) 110 makes a hypertext transport protocol (HTTP) request (via signaling (1)) to a content source 165. The content source 165 is to provide video to the user equipment 110, and the request gets routed through the PDN-GW 135 and is proxied at the media optimizer 150. In signaling (2), there are a number of transmission control protocol (TCP) connections created, including the content source 165 to a proxy in the media optimizer 150, from the media optimizer 150 to the PDN-GW 135, and from the PDN-GW 135 to the user equipment 110. In this example, the media optimizer 150 acts as a "pass through" from a media modification perspective.

In signaling (3), the media optimizer 150 buffers a video stream 410 (on a bearer) corresponding to a requested video and requests a RAN type from the CAN-EG 145. In signaling (4), the CAN-EG 145 responds with an indication of, e.g., "content aware RAN". This indication indicates the RAN is able to accept multiple different resolutions of video in a video stream. Concerning signaling (5), the media optimizer 150 determines video optimization parameters and streams content in multiple resolutions. That is, the video stream 420 (on a bearer) includes multiple video resolutions of video. In (6), the eNodeB 120 selects appropriate resolution based on cell/sector conditions that were reported to the eNodeB 120 via the CAN-EG 150. The term bearer may be defined to be an aggregate of one or more communication flows such as related to one or more services in a network, such as an LTE network.

As optional elements, in signaling (7), the eNodeB 120 reports status of video information at the eNodeB 120. Responsive to this signaling, the media optimizer 150 selects one or more of the multiple resolutions and then streams only the selected resolution(s) in step 8 (which illustrates the selected resolution(s) 430 sent via a bearer). That is, as described above, there may be a set of frames that have to be transmitted in total in order, e.g., to maintain video synchronization. If the RAN is in the middle of transmitting the set of frames (at an initial resolution), once a new set of frames is selected from the multiple resolutions of video at a different resolution than the initial resolution, the RAN can signal to the media optimizer/server that video information related to the new resolution was swapped with video information related to the initial resolution. The media optimizer/server can use this information, e.g., to determine that at least video information corresponding to the new resolution should be sent to the RAN and perhaps not to send video information corresponding to the initial resolution, as least, e.g., for certain set(s) of frames. Similarly, the RAN may select only video information in the multiple resolutions of video corresponding to the initial resolution. The media optimizer/server can use this information, e.g., to determine that at least video information corresponding to the initial resolution should be sent to the RAN.

Figure 5A:
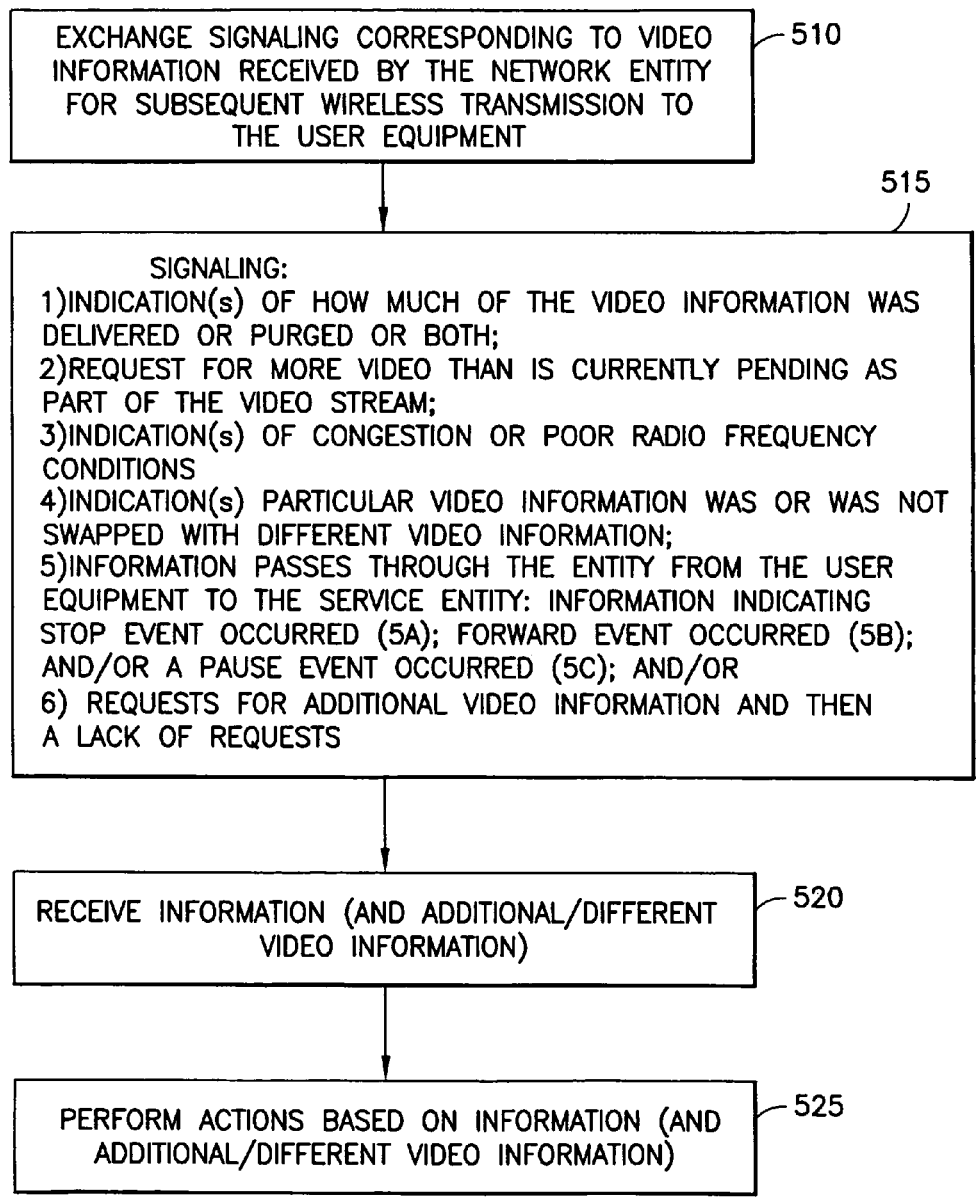
FIG. 5 includes FIG. 5A, a flowchart of operations performed by a network entity having video information for delivery to a user equipment, and FIG. 5B, a flowchart of operations performed by an entity providing access by a user equipment to a video stream.
Figure 5B:
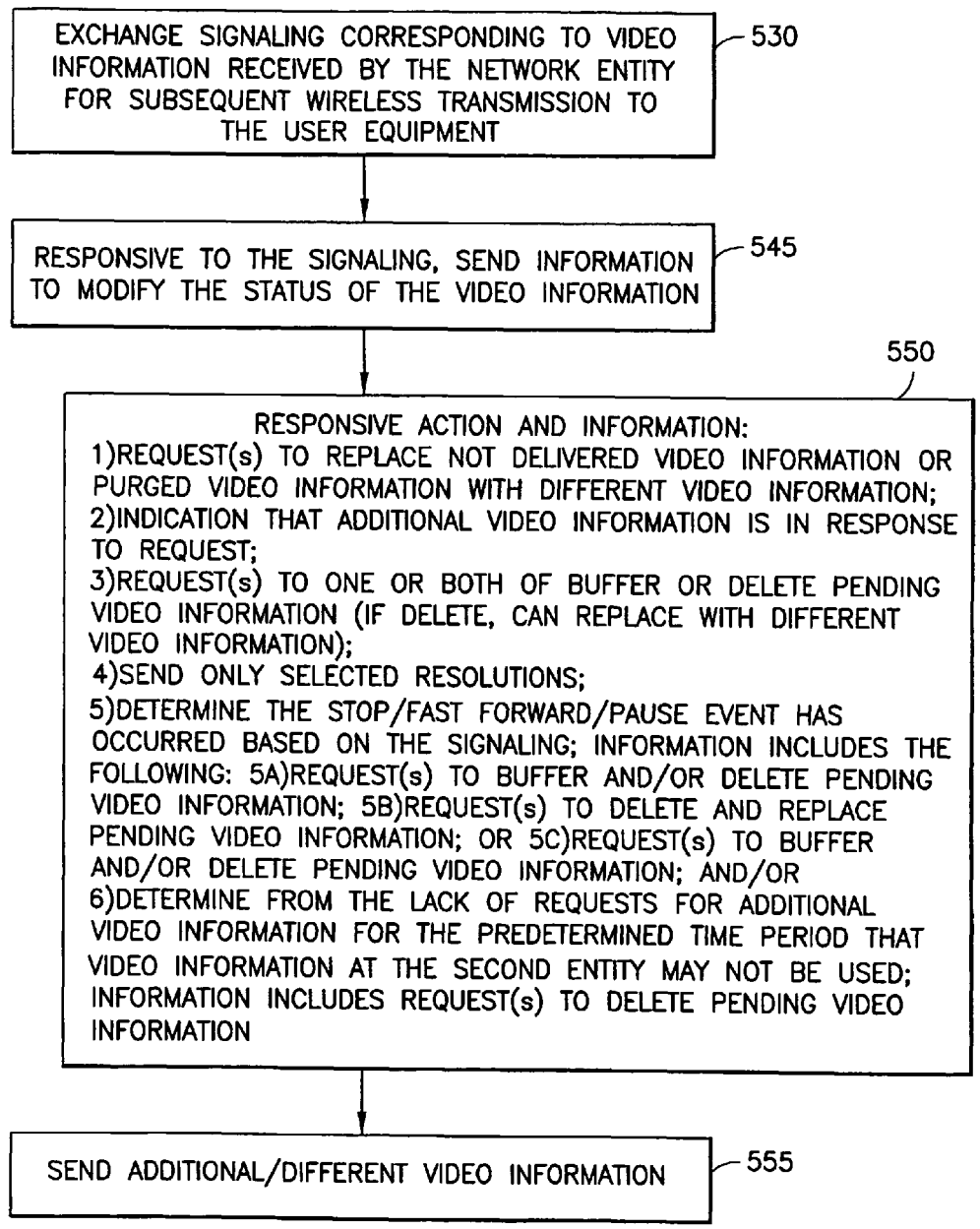

Referring now to FIG. 5, this figure includes FIG. 5A, a flowchart of operations performed by a network entity having video information for delivery to a user equipment, and FIG. 5B, a flowchart of operations performed by a service entity providing access by a user equipment to a video stream. In block 510, the network entity exchange signaling with the service entity, the signaling corresponding to video information received by the network entity for subsequent wireless transmission to the user equipment. The network entity may be a base station (e.g., eNodeB 120, as part of a radio access network), a mobility management entity 115 (as part of a core network for the EPC), a home base station gateway (e.g., eNodeB, as part of a radio access network), or an evolved universal terrestrial access network entity (e.g., SGW 125) (as part of a core network for the EPC). It is noted the network entity may be the entity (e.g., eNB or NodeB or another base station) that wirelessly transmits the video information or may be connected to the entity that wirelessly transmits the video information (and the network entity does not transmit the video information). In block 530, the service entity providing access by the user equipment to the video stream exchanges signaling with the network entity corresponding to video information received by the network entity for subsequent wireless transmission to the user equipment. This service entity can be, e.g., media optimizer 150 (through which passes the video stream from a video server, shown as content source 165 in FIG. 4), an origin video server (e.g., content source 165 in FIG. 4) comprising a video corresponding to the video stream, or a surrogate video server (e.g., the CDN surrogate 210 in FIG. 1) comprising a cached copy of the video. The first information can include any of the information described above, including (as shown in block 515) for instance:

1) Indication(s) of how much of the video information was delivered or purged or both;

2) Request for more video than is currently pending as part of the video stream;

3) Indication(s) of congestion or poor radio frequency conditions

4) Indication(s) that particular video information was or was not swapped with different video information;

5) Information passes through the entity from the user equipment to the service entity: Information indicating stop event occurred (5A); forward event occurred (5B); and/or a pause event occurred (5C); and/or 6) Requests for additional video information and then a lack of requests.

A note about (5) and (6) is in order. There are instances where the video protocol allows communication of actual commands, such as stop, fast forward, and pause between the user equipment and the service entity (and passing through the network entity). In these instances, the service entity can examine signaling from the user equipment and passed through the network entity to the service entity to determine if the commands and their corresponding events have occurred. This is the situation in (5). In (6), the situation is that the user equipment and therefore the network entity request additional video through typically multiple requests. If the user stops, fast forwards, or pauses, some video protocols do not provide communication of these commands. In this situation, the service entity can determine there were a number of requests for additional video and then the requests stopped (e.g., for a predetermined time). This situation can be interpreted (by the service entity) to mean that the pending video at the network entity can likely be deleted.

In block 545, responsive to the signaling the service entity sends information to modify the status of the video information. The information can include, as examples the following responsive actions (e.g., in (5) and (6)) and information (in block 550):

1) Request(s) to replace not delivered video information or purged video information with different video information:

2) Indication that additional video information is in response to request;

3) Requests to one or both of buffer or delete video information (if delete, can replace with different video information);

4) Send only selected resolutions;

5) Determine the stop/fast forward/pause event has occurred based on the signaling; Information includes the following: 5A) Request(s) to buffer and/or delete pending video information; 5B) Request(s) to delete and replace pending video information; or 5C) Request(s) to buffer and/or delete pending video information; and/or 6) Determine from the lack of requests for additional video information for the predetermined time period that video information at the second entity may not be used; Information includes request(s) to delete pending video information.

It is noted that the "request(s)" in FIG. 5 can be any signaling such as instructions, messages, information elements, and the like. It is noted that numbers 1-6 for each of blocks 515 and 550 correspond to each other. That is, if the first information in block 515 is "4) Indication(s) particular video information was or was not swapped", the second information in block 550 is "4) Send only selected resolutions". As noted above, in (5), the service entity can determine based on signaling (e.g., comprising video protocol commands or other messages indicating stop, fast forward, or pause events have occurred) whether stop, fast forward, or pause events have occurred, and then send appropriate information. In (6), the service entity determines from the lack of requests for additional video information for the predetermined time period that video information at the second entity may not be used. The service entity then sends information including request(s) to delete pending video information. In block 555, the service entity sends the additional/different video information (if any) corresponding to the information from block 550.

In block 520, the network entity receives the information and any additional/different video information. In block 525, the network entity performs any requires actions based on the information (and the additional/different video information). For instance, video information could be deleted, purged, or replaced.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memory 325 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   exchanging signaling between
      a first entity providing access by a third entity user equipment to a video stream and
      a second entity, through which the video stream passes prior to being delivered via wireless transmission to the third entity user equipment, receiving video information corresponding to the video stream,
      wherein the exchanged signaling is associated with the video information received at the second entity and comprises receiving at the first entity from the second entity one or more indications of how much of the video information was
         delivered by the second entity to the third entity user equipment, and
         purged from memory in the second entity, wherein purging occurs due to a memory limitation encountered by the first entity or a loss of the video stream;
   sending other video information from the first entity to the second entity; and
   responsive to the exchanged signaling, sending information from the first entity to the second entity to modify status at the second entity of at least a portion of the video information previously received at the second entity, wherein the information comprises one or more requests to either
      replace video information delivered to the second entity, but not yet delivered to the third entity user equipment with the other video information which is not the same as or comprises different video information than originally delivered,
      replace video information purged by the second entity prior to being delivered to the third entity with the other video information, or
      both replace delivered video information and replace purged video information.

2. The method of claim 1, wherein the exchanged signaling comprises receiving at the first entity from the second entity a request for more video than is currently pending as part of the video stream, wherein the information comprises an indication that additional video information is in response to the request, and wherein the method further comprises sending from the first entity to the second entity the additional video information.

3. The method of claim 1, wherein the exchanged signaling comprises receiving at the first entity from the second entity one or more indications of congestion or poor radio frequency conditions, and wherein the information comprises one or more requests to one or both of buffer or delete pending video information at the second entity.

4. The method of claim 1, wherein the information comprises one or more requests to delete video information at the second entity and replace the deleted pending video information with different video information, and wherein the method further comprises the first entity sending to the second entity the different video information.

5. The method of claim 4, wherein the exchanged signaling comprises receiving at the first entity from the second entity one or more indications that particular video information was or was not swapped with different video information.

6. The method of claim 1, wherein:
   the information comprises first information;
   the exchanged signaling further comprises signaling passing through the second entity from the third entity user equipment to the first entity and comprising second information indicating a video stop event has occurred for the video stream;
   the method further comprises, responsive to the signaling, the first entity examining the second information and determining the video stop event has occurred; and
   the first information comprises one or more requests to one or both of buffer or delete at least some pending video information at the second entity.

7. The method of claim 1, wherein:
   the information comprises first information;
   the exchanged signaling further comprises signaling passing through the second entity from the third entity user equipment to the first entity and comprising second information indicating a fast forward event has occurred for the video stream;
   the method further comprises, responsive to the signaling, the first entity examining the second information and determining the fast forward event has occurred;
   the first information comprises one or more requests to delete at least some pending video information at the second entity and to replace the deleted video information with different video information; and
   the method further comprises sending from the first entity to the second entity the different video information.

8. The method of claim 1, wherein:
   the information comprises first information;
   the exchanged signaling further comprises signaling passing through the second entity from the third entity user equipment to the first entity and comprising second information indicating a video pause event has occurred for the video stream;
   the method further comprises, responsive to the signaling, the first entity examining the second information and determining the video pause event has occurred; and
   the first information comprises one or more requests to one or both of buffer or delete at least some pending video information at the second entity.

9. The method of claim 1, wherein:
   the exchanged signaling comprises requests from the second entity to the first entity for additional video information and then comprises a lack of requests for additional video information for a predetermined time period;
   the method further comprises, responsive to the signaling, the first entity determining from the lack of requests for additional video information for the predetermined time period that video information at the second entity may not be used; and
   the first information comprises one or more requests to delete at least some pending video information at the second entity.

10. The method of claim 1, wherein the first entity comprises one of a media optimizer through which passes the video stream from a video server, an origin video server comprising a video corresponding to the video stream, or a surrogate video server comprising a cached copy of the video.

11. The method of claim 1, wherein the second entity comprises a base station, a mobility management entity, a home base station gateway, or an evolved universal terrestrial access network entity.

12. A method, comprising:
    exchanging signaling between
        a first entity providing access by a third entity user equipment to a video stream and
        a second entity, through which the video stream passes prior to being delivered via wireless transmission to the third entity user equipment, receiving video information corresponding to the video stream, wherein the exchanged signaling is associated with the video information received at the second entity and comprises sending from the second entity to the first entity one or more indications of how much of the video information was either delivered by the second entity to the third entity user equipment, and purged from memory in the second entity, wherein purging occurs due to a memory limitation encountered by the first entity or a loss of the video stream;

receiving at the second entity other video information sent from the first entity; and responsive to the exchanged signaling, receiving from the first entity and at the second entity information to modify status at the second entity of at least a portion of the video information previously received at the second entity, wherein the information comprises one or more requests to either replace video information delivered to the second entity, but not yet delivered to the third entity user equipment with the other video information which is not the same as or comprises different video information than originally delivered, replace video information purged by the second entity prior to being delivered to the third entity with the other video information, or both replace delivered video information and replace purged video information.

\* \* \* \* \*